Nov. 24, 1942.  B. R. GRANBERG ET AL  2,302,854
MACHINE TOOL
Filed May 20, 1940  3 Sheets-Sheet 2
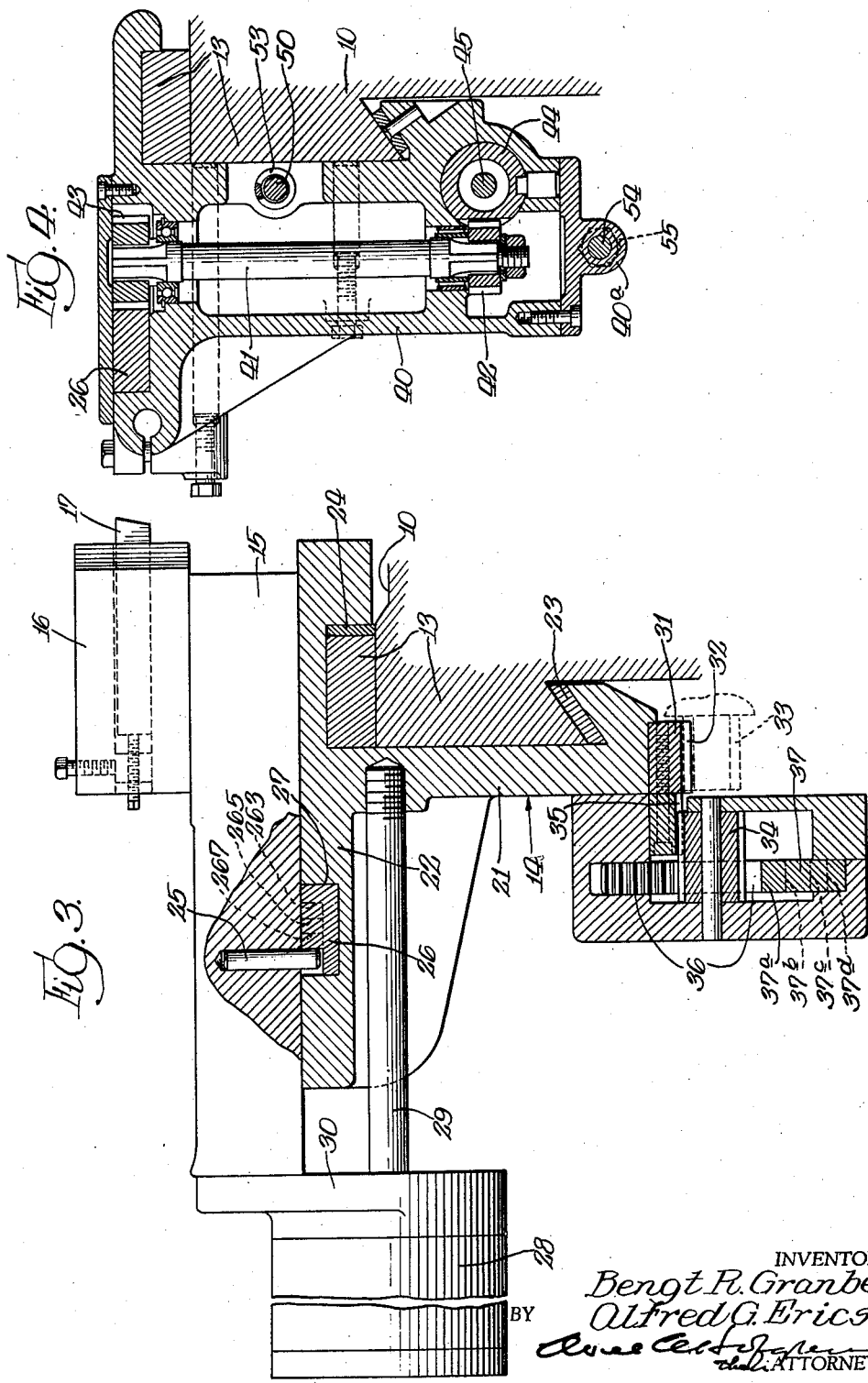
INVENTOR.
Bengt R. Granberg,
Alfred G. Ericson,
BY
ATTORNEY.

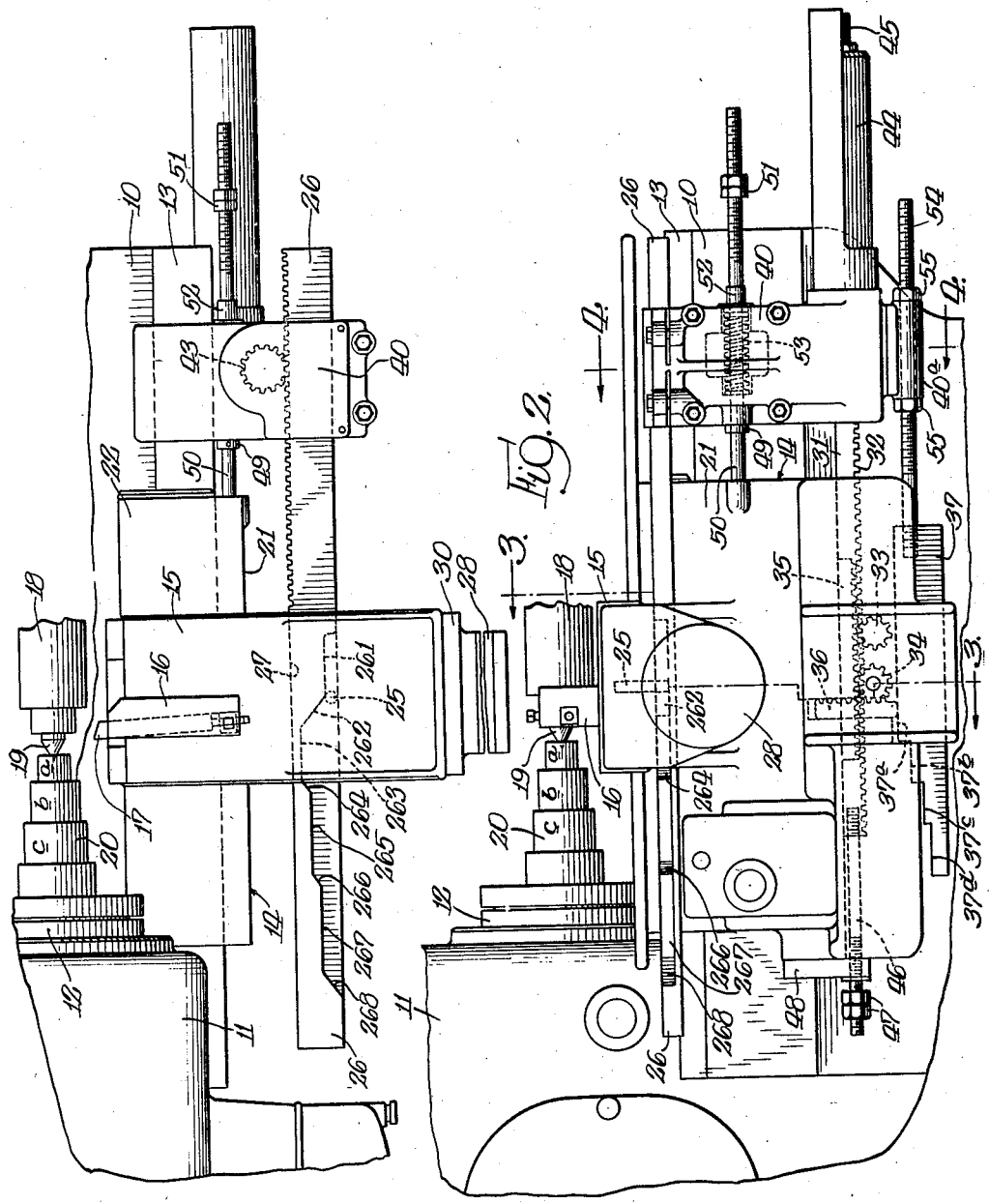

Nov. 24, 1942.  B. R. GRANBERG ET AL  2,302,854
MACHINE TOOL
Filed May 20, 1940  3 Sheets-Sheet 3
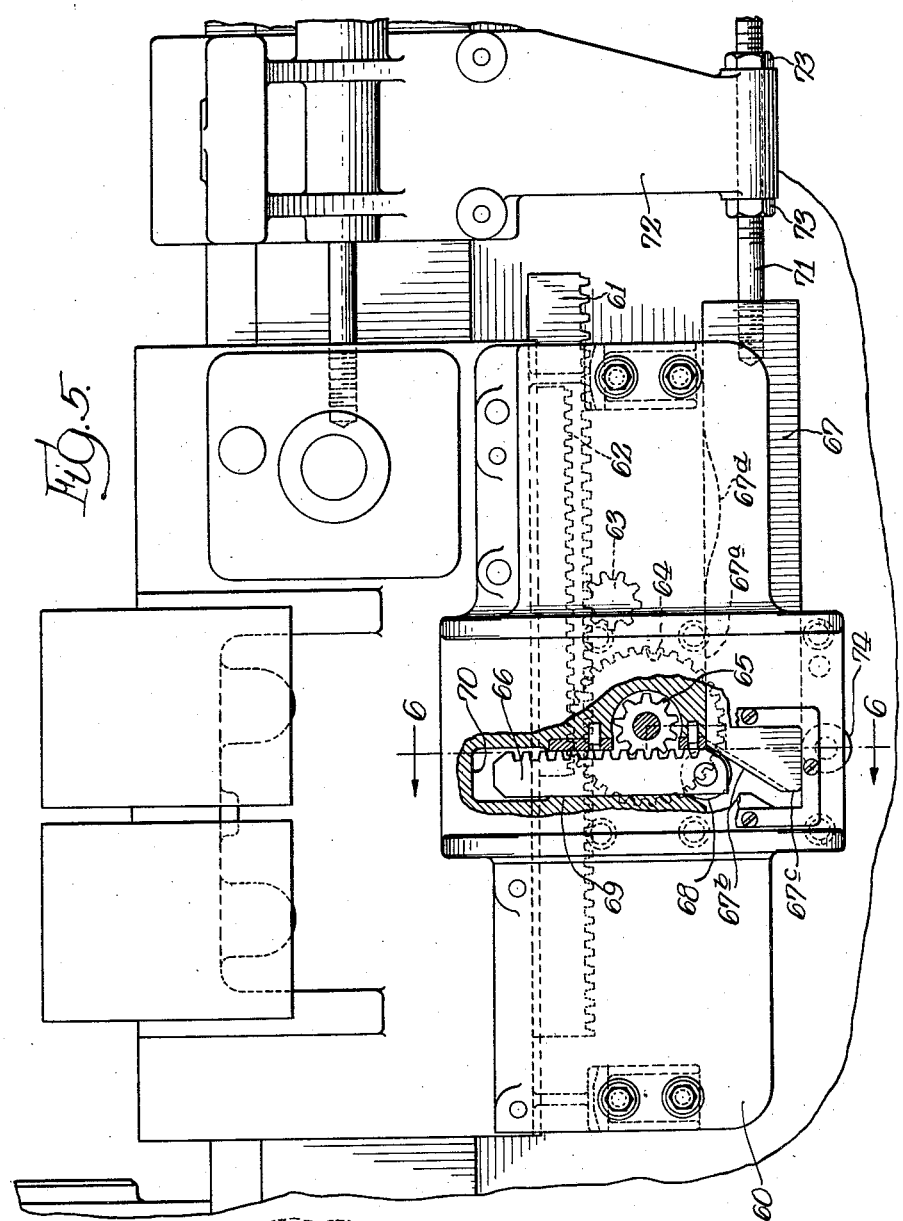
INVENTOR.
Bengt R. Granberg.
Alfred G. Ericson.
BY
their ATTORNEY.

Patented Nov. 24, 1942

2,302,854

UNITED STATES PATENT OFFICE 2,302,854

MACHINE TOOL

Bengt R. Granberg and Alfred G. Ericson, Rockford, Ill., assignors to Sundstrand Machine Tool Co., Rockford, Ill., a corporation of Illinois Application May 20, 1940, Serial No. 336,118

19 Claims. (Cl. 82—21)

The invention relates generally to a machine tool, and more particularly to a feed mechanism for the tool carriage and cross slide thereof.

The general object of the invention is to provide a new and improved feed mechanism for the carriage and cross slide of a machine tool capable of producing different and improved movements of the carriage and the cross slide.

A more particular object of the invention is to perfect a new and improved feed mechanism for the carriage and cross slide of a machine tool in which the cross slide may be moved independently of the carriage.

Another object is to provide in a machine tool having a carriage, a cross slide and power means for driving the same, a feed mechanism for the carriage and a cross slide which includes a feed bar driven from the power means and having separate driving connections with the carriage and cross slide respectively.

It is also an object of the invention to provide in a machine tool, having a carriage, a cross slide and power means with separate driving connections for the carriage and cross slide respectively, means for adjusting said connections for variously timing the actuation of the carriage and cross slide with respect to each other for obtaining different cycles of movement thereof.

And it is also an object to provide in a machine tool, having a carriage, a feed mechanism for the carriage including a driving member and a rotatively mounted member on the carriage functioning as a connection between the driving member and the carriage but controllable for rendering the connection ineffective, together with controlling means governing the connection in a manner to permit slowing down of the carriage before it stops.

Other objects and advantages will become apparent from the following detailed description taken in connection with the accompanying drawings in which:

Fig. 1 is a fragmentary plan view of a machine tool in the nature of a lathe, including a feed mechanism embodying this invention Fig. 2 is a fragmentary front elevation of the machine shown in Fig. 1 and disclosing a control feature associated with the feed mechanism.

Fig. 3 is a sectional view on a larger scale taken substantially as indicated at line 3—3 on Fig. 2.

Fig. 4 is a detail section taken substantially as indicated at line 4—4 on Fig. 2.

Fig. 5 is a fragmentary front elevation of a machine tool showing a modified form of carriage feed with a slow-down mechanism.

Fig. 6 is a detail section taken as indicated at line 6—6 on Fig. 5.

While the invention is susceptible of various modifications and alternative constructions, it is shown in the drawings and will be described hereinafter in a preferred embodiment and one modification, but it is not intended that the invention is to be limited thereby to the specific embodiments disclosed, but it is intended to cover all modifications and alternative constructions falling within the spirit and scope of the appended claims.

For purposes of disclosure the invention is here shown embodied in a lathe of the same general character as that illustrated in the co-pending application of Bengt R. Granberg and Alfred G. Ericson, Serial No. 228,522, filed September 6, 1938. The lathe comprises generally a bed 10 with a head stock 11 at one end journaling a spindle 12. A horizontal guideway 13, formed on the bed 10 or secured thereto, slidably supports a carriage 14 for movement longitudinally of the lathe, and the carriage is equipped with a cross slide 15 supporting the tool holder 16 in which the cutting tool, indicated at 17, is secured in any convenient manner. For certain classes of work the lathe is provided with a tail stock 18 having a center 19 engaging the work-piece, such as that shown at 20 in Figs. 1 and 2. It will be understood that suitable power means is provided for driving the spindle 12, and that suitable connections therefrom, or independent power means, will be provided for driving the carriage and its cross slide; and in a production machine of this character certain movements and adjustments may be effected by the application of compressed air mechanism, but for the purpose of simplifying the drawings these power connections and mechanisms are omitted, since they may be conventional, and detailed description of them is unnecessary for an understanding of the present invention.

The carriage 14 includes a vertical front or apron portion 21 and a horizontally extending table portion 22 on which the slide 15 is carried. These parts include bearing surfaces which fit slidably against the vertical and horizontal faces of the guideway 13 and are maintained in proper relation thereto by gibs, indicated at 23 and 24 in Fig. 3. The travel of the cross slide 15 is controlled by the engagement of a cam follower pin 25 which bears normally against a cam bar 26 extending through a suitable guideway 27 formed in the table portion 22 of the carriage; and during operation of the tool 17 the pin 25 is held in contact with the cam face of the bar 26 by air pressure applied in an air cylinder 28, having a piston rod 29 anchored in the apron 21 of the carriage while the head 30 of the cylinder is secured directly to the cross slide 15, as seen in Fig. 3.

In its longitudinal travel on the guideway 13 the carriage 14 is driven by means of a feed bar 31 having rack teeth 32 which mesh with the teeth of a driving pinion 33 actuated from any suitable power source, not shown. Driving connection between the feed bar 31 and the carriage 14 is provided by a gear 34 rotatably journaled on the apron 21 of the carriage 14 and meshed with the teeth of a supplemental rack 35 secured rigidly to the feed bar 31. If the gear 34 were freely rotatable, the longitudinal movement of the feed bar 31 would merely turn the gear 34 without causing any movement of the carriage, but said gear 34 also meshes with rack teeth on a vertically disposed plunger 36 guided for reciprocation in the apron of the carriage 14; and, as shown in Fig. 2, the lower end of the plunger 31 engages a horizontal surface 37a of a control cam bar 37 supported rigidly on the frame of the machine. Thus when the pinion 33 is revolved in a direction to move the feed bar 31 forwardly—that is, toward the head stock 11— the tendency for the rack 35 to rotate the gear 34 and feed the plunger 36 downwardly is checked by the engagement of the plunger with the horizontal cam surface 37a with the result that the gear 34 locks the carriage 14 to the feed bar 31 for travel therewith. In the form shown, the cam bar 37 is provided with stepped cam surfaces 37a, 37b, 37c and 37d. As the carriage moves forward the plunger 36 eventually reaches the end of the surface 37a, and the torque of the gear 34 is permitted to drive the plunger 36 downward onto the next step 37b; but during such rotation of the gear 34 the carriage 14 will stand still while the feed bar 31 continues to travel relatively to the carriage so as to rotate the gear 34 and feed the plunger 36 through the limited distance between the level of the cam surface 37a and that of the surface 37b. It will be apparent that upon encounter of the plunger 36 with the cam surface 37b further rotation of the gear 34 will become impossible, with the effect that the carriage 14 will again be locked to the feed bar 31 for further forward movement. With a cam bar 37 of the form illustrated the carriage 14 will be arrested again as the plunger moves from the level of the cam surface 37b to that of 37c, and once more when the plunger 36 has traversed the surface 37c and is shifted to the surface 37d.

It will be observed that the particular workpiece 20 which is chosen for the purposes of illustration is of stepped formation, and it may be explained that the purpose of arresting the carriage 14 after each interval of forward travel, as just described, is to allow time for the tool 17 to withdraw from the position in which it has been cutting one step of the work-piece 20 to a position for cutting or finishing the next step of said piece. Such withdrawal of the tool 17 is accomplished under control of the cam bar 26 which, in conjunction with the air cylinder 28, causes the necessary transverse movement of the cross slide 15 by which the tool 17 is carried. The operation of the cam bar 26 is very similar to that of a corresponding element shown in our co-pending application Serial No. 228,522, but will now be briefly described.

The machine is equipped with a bracket 40 which is adjustably but fixedly secured to the bed 10, and in which there is journaled a vertical shaft 41 having a gear 42 at its lower end, and a gear 43 at its upper end. A cylindrical rack bar 44 is slidably mounted in the bracket 40 with its teeth meshing with the gear 42, and this rack 44 is coupled to the feed bar 31 for movement therewith. Its relation to the feed bar 31 is rendered adjustable by means of a threaded rod 45, and suitable clamping nuts on said rod, as more fully described in our said co-pending application Serial No. 228,522, but for the purposes of the present description it may be understood that the rack 44 moves as a unit with the feed bar 31. Such movement of the rack 44 rotates the gear 42 and shaft 41, thus transmitting rotation to the gear 43 at the upper end of said shaft and corresponding movement to the cam bar 26 which is provided with rack teeth meshing with the gear 43, as seen in Fig. 1. The arrangement is such that movement of the feed bar 31 and rack bar 44 toward the head stock 11 produces movement of the cam bar 26 in the opposite direction; but this movement is not arrested with the arrest of the carriage 14 which occurs when the plunger 36 is shifted from one level of the control bar 37 to its next step or level. Thus, while the carriage 14 stands still, the rack bar 26 continues to move to the right, as viewed in Fig. 1, so that the follower pin 25 engages one of the inclined cam faces of the cam whereby the cross slide 15 is shifted inwardly or outwardly to a position ready for operation upon one of the cylindrical surfaces of said work-piece 20, or finally, to a position clear of the work and ready for return travel of the tool carriage to its starting point.

To clarify the operation and relative movements of the carriage 14 and its cross slide 15, a single complete cycle of tool movement will be described. The operator, having placed the work-piece 20 in position between the spindle 12 and the center 19, will start the machine, the carriage being in its initial position at the extreme right end of its range of travel as adjusted for this particular piece of work. The first movement of the feed bar 31 will rotate the gear 34 in the direction for shifting the plunger 36 from its extreme upper limit downwardly into contact with the upper surface 37a of the control cam bar 37, as shown in Fig. 2; then, with the plunger thus engaging the surface 37a, the carriage will travel to the left. Substantially at the commencement of this movement the air cylinder 28 will be actuated automatically to press the follower pin 25 against the surface 261 of the cam bar 26. As the air pressure holds the pin 25 to the bar 26 it follows the inclined portion 262, causing the cross slide 15 and the tool 17 to move inwardly to the first cutting position, while the carriage continues its travel toward the left, and as the pin 25 traverses the surface 263 of the cam bar 26, the tool 17 performs its first cut upon the portion a of the work-piece 20. Just at the completion of this cut the plunger 36 leaves the surface 37a and the forward travel of the carriage ceases while the plunger is fed toward the surface 37b of the control bar 37; but during this interval the cam bar 26 continues to move to the right, causing the pin 25 to traverse the inclined surface 264 and withdrawing the cross slide 15 and its tool to the proper position for making the next cut. When the plunger 36 contacts the step 37b the carriage is again locked to the feed bar 31, and its forward travel is resumed, while the tool 17 performs its cutting operation on the part b of the work-piece and the follower pin traverses the portion 265 of bar 26. When the carriage is again arrested while the plunger moves from cam face 37ᵇ to the surface 37ᶜ, the pin 25 traverses the inclined surface 266 and withdraws the tool to position for its third cut, which is made upon the portion c of the work-piece 20, with the plunger 36 contacting the surface 37ᶜ and with the pin 25 riding along the portion 267 of the bar 26. Finally when the plunger runs off the end of the surface 37ᶜ and moves toward 37ᵈ the pin 25 is engaged by the inclined face 268 for withdrawing the tool from the work to a proper position for return travel of the carriage to its starting point, and the air cylinder then releases its pressure on the pin 25.

Such return travel is accomplished by automatic reversal of the rotation of the feed pinion 33, causing the feed bar 31 to move to the right. This movement first produces reverse rotation of the gear 34, thus raising the plunger 36 to its upper limit, clear of the cam face 37ᵃ of the bar 37. Thereupon, the further movement of the feed bar 31 to the right is transmitted to the carriage by an extension rod 46 secured to the end of the bar 31 and provided with adjustable stop nuts 47 which engage a lug 48 on the carriage, as seen in Fig. 2. The return movement of the carriage is limited by a collar 49 carried on a rod 50 which extends from the carriage 14 through the bracket 40, so that the collar 49 abuts the bracket at one limit of carriage movement. At the opposite limit an adjustable stop nut 51 on the threaded end of the rod 50 abuts a stop sleeve 52 carried by the bracket 40 and cushioned on a spring 53 pocketed within the bracket 40, as seen in Fig. 4.

It will be understood that for machining a piece of work of different contour from that shown at 20 the control cam bar 37 must be of somewhat different proportions, and the cam bar 26 may be formed with steps and oblique sections of different dimensions. If desired, the bars 26 and 37 may be made with applied cam elements in the form of blocks screwed in place so that these blocks may be shifted and adjusted to some extent for altering the effective cam faces. And for accurately relating the operation of the bar 37 to that of the bar 26 the bar 37 is adjustably mounted by means of a threaded rod 54 secured by clamping nuts 55 in a portion 40ᵃ of the bracket 40.

Figs. 5 and 6 illustrate a modification of the mechanism for controlling the travel of the carriage when it is desired to arrest such travel gradually and gently at a regulated or controlled rate. Fig. 5 shows a carriage 60 and a feed bar 61 with a supplemental rack bar 62 carried thereby. The feed bar is driven from a pinion 63 and the supplemental rack 62 meshes with the teeth of a gear wheel 64 which has rigid with it a smaller gear 65 in mesh with the teeth of the transversely movable rack or plunger 66. The cam bar 67, which is illustrated in connection with this form of the invention, is shown as providing for stopping the carriage 60 only once, but it will be understood that the same principle will be applicable to a multiple cam bar somewhat like the bar 37 shown in Fig. 2.

The cam bar 67 includes a straight horizontal face 67ᵃ which rides under the end of the plunger 66 for locking the small gear 65 and the gear 64 against rotation, so that travel of the feed bar 61 shall cause corresponding movement of the carriage 60. But the end of the cam bar 67 includes an oblique shoulder 67ᵇ, and, preferably, the plunger 66 is fitted with a roller 68 which travels along this oblique surface 67ᵇ when the plunger passes the end of the horizontal face 67ᵃ. The oblique relation of the face 67ᵇ to the direction in which the plunger 66 can travel in its guideway 69, requires that the descent of the plunger 66 in its guideway 69 be accompanied by a certain amount of travel of the carriage 60 longitudinally of the bar 67. In other words, a certain portion of the movement of the feed bar 61 is translated by the gear wheels 64 and 65 into transverse movement of the plunger 66, but the remaining portion of the movement is utilized to produce forward travel of the carriage at a reduced rate of speed. In this way the travel of the carriage may be slowed down before the carriage is brought to rest, so that the cutting movement of the tool may be terminated very accurately, or the reverse travel of the carriage may be initiated after the parts have been brought to rest gradually and gently, thus avoiding unnecessary shock in the operation of the machine. After the plunger roller 68 has traversed the full length of the inclined or oblique cam face 67ᵇ it will move a short distance downwardly along the vertical face 67ᶜ at the end of the cam bar 67, and in the construction as shown it is contemplated that the drive pinion 63 will then be reversed. This will first cause reverse rotation of the gears 64 and 65, resulting in transverse movement of the plunger 66 upwardly until its upper end strikes the end wall 70 of the guideway 69, thus arresting the plunger and interlocking the carriage with the rack 62 and feed bar 61 to which the rack is secured. Thereafter the feed bar will draw the carriage back until it reaches its starting position and is arrested by any suitable means similar to that employed in the structure shown in Figs. 1 to 4, or by stopping the drive pinion 63.

For the purpose of accurately timing the action of the cam bar 67 and its oblique face 67ᵇ the bar may be adjustably carried by a threaded rod 71 engaged in a bracket 72 and secured at adjusted position by means of nuts 73. In the carriage 60, the bar 67 is accommodated in a fitted guideway and provided with an anti-friction roller 74 to insure smooth operation.

In the particular structure illustrated in Figs. 5 and 6 it will be noted that the gear 64 is considerably larger than the gear 65, thus causing the plunger 66 to be driven downwardly at a rate of speed which is appreciably slower than the movement of the feed bar 61 and its associated rack 62 relative to the carriage 60. This relation of the gears, added to the retarding effect of the oblique cam face 67ᵇ, may be made to reduce the speed of carriage travel to one-fourth, or one-fifth, or any other desired fraction of its normal feed in working direction, thus insuring an accurate stop at the limit of the cutting movement, and preparing the carriage for a prompt reversal without shock. And if it should be desirable, in a particular case, to reduce the feed of the carriage during an intermediate portion of the cutting operation, a depression may be formed, as indicated in dotted outline at 67ᵈ, in the upper face of the cam bar 67, thus allowing the plunger 66 to move downward temporarily so as to absorb a part of the feeding movement derived from the feed bar 61.

We claim as our invention:

1. In a machine tool, a carriage mounted for reciprocatory movement, a reciprocatory driving member mounted for movement relative to said carriage, and a driving connection between said driving member and said carriage including a toothed gear journaled for rotation on the carriage and meshing with rack teeth on said driving member, and a toothed member constantly meshing with said gear and movable thereby on the carriage in response to rotation of the gear, together with means directly controlling the movement of said toothed member and thereby controlling movement of the carriage.

2. In a machine tool, a carriage mounted for reciprocatory movement, a reciprocatory driving member mounted for movement relative to said carriage, and a driving connection between said driving member and said carriage including a toothed gear member journaled for rotation on the carriage and meshing with rack teeth on said driving member, and a toothed plunger constantly meshing with said gear member and movable thereby on the carriage transversely of the direction of movement of the carriage, together with means providing a control surface along which the carriage travels positioned for encounter by said plunger and extending for engagement therewith during travel of the carriage.

3. In a machine tool, a carriage mounted for reciprocatory movement, a reciprocatory driving member mounted for movement relative to said carriage, and a driving connection between said driving member and said carriage including a toothed gear member journaled for rotation on the carriage and meshing with rack teeth on said driving member, and a toothed plunger constantly meshing with said gear member and movable thereby on the carriage transversely of the direction of movement of the carriage, together with means providing a control surface along which the carriage travels positioned for encounter by said plunger and extending for engagement therewith during travel of the carriage, the contour of said control surface including a portion parallel to the direction of travel of the carriage for holding the plunger and gear member stationary and rendering the driving connection effective, said surface also including a non-parallel portion in following which the plunger moves transversely of the direction of carriage travel, releasing said gear member for rotation and retarding the travel of the carriage.

4. In a machine tool, a carriage mounted for reciprocatory movement, a reciprocatory driving member mounted for movement relative to said carriage, and a driving connection between said driving member and said carriage including a toothed gear member journaled for rotation on the carriage and meshing with rack teeth on said driving member, and a toothed plunger constantly meshing with said gear member and movable thereby on the carriage transversely of the direction of movement of the carriage, together with means providing a control surface along which the carriage travels positioned for encounter by said plunger and extending for engagement therewith during travel of the carriage, the contour of said control surface including a portion parallel to the direction of travel of the carriage for holding the plunger and gear member stationary and rendering the driving connection effective, said surface also including a transversely extending portion parallel to the direction in which the plunger is mounted for movement on the carriage whereby movement of the driving member is transformed into transverse movement of the plunger along said transverse portion of the control surface for arresting the travel of the carriage without stopping the driving member.

5. In a machine tool, a carriage mounted for reciprocatory movement, a reciprocatory driving member mounted for movement relative to said carriage, and a driving connection between said driving member and said carriage including a toothed gear member journaled for rotation on the carriage and meshing with rack teeth on said driving member, and a toothed plunger constantly meshing with said gear member and movable thereby on the carriage at right angles to the direction of movement of the carriage, together with means providing a control surface along which the carriage travels positioned for encounter by said plunger and extending for engagement therewith during travel of the carriage, the contour of said control surface including a portion parallel to the direction of travel of the carriage for holding the plunger and gear member stationary and rendering the driving connection effective, said surface also including a perpendicularly extending portion whereby all movement of the driving member is transformed into rotation of the gear member and movement of the plunger along said perpendicular portion of the control surface for arresting the travel of the carriage without stopping the driving member.

6. In a machine tool, a carriage mounted for reciprocatory movement, a reciprocatory driving member mounted for movement relative to said carriage, and a driving connection by which movement is transmitted from said driving member to said carriage including a toothed gear member journaled for rotation on the carriage and meshing with rack teeth on said driving member, and a holding member mounted on the carriage for movement transversely of the direction of carriage travel and operatively connected to said gear member to be so moved by rotation thereof, together with a control bar extending adjacent the path of travel of the carriage and having a face along which said holding member is slidable as the carriage advances, said face including a portion parallel to the direction of carriage movement which prevents transverse movement of the holding member and rotation of the gear member, thus maintaining operative driving connection between the driving member and the carriage, and said face having also a transversely trending portion along which the holding member is moved by rotation of the gear member, thus modifying the effectiveness of said gear member in transmitting movement from the driving member to the carriage.

7. In a machine tool, a carriage mounted for reciprocatory movement, a cross slide on the carriage, a reciprocatory driving member mounted for movement relative to said carriage, an actuating member connected for moving the cross slide transversely of the direction of carriage movement, means interconnecting said actuating member and said driving member for simultaneous operation, and a driving connection between said driving member and said carriage including a toothed gear member journaled for rotation on the carriage and meshing with rack teeth on said driving member, and control means arranged for holding said gear against rotation during a predetermined travel of the carriage, thereby rendering the driving connection effective for causing such travel said means then releasing said gear and thereby rendering the driving connection ineffective and arrest the carriage without stopping the movement of the driving member and the actuating member connected therewith.

8. In a machine tool, a carriage mounted for reciprocatory movement, a reciprocatory driving member mounted for movement relative to said carriage, and a driving connection between said driving member and said carriage including a plunger mounted on the carriage for movement transversely of the direction of travel of the carriage, a fixed guide bar extending along the path of carriage travel and engaging the plunger, and motion-transmitting means connecting the plunger with said driving member, the guide bar including a portion extending parallel to the direction of carriage movement to hold the plunger stationary on the carriage and render the driving connection effective for fully applying movement of the driving member to the carriage, and said guide bar having also an obliquely extending portion along which the plunger is moved by the driving member acting through said transmitting means, while only a portion of the driving member movement is applied to the carriage and said carriage is thus retarded.

9. In the combination defined in claim 8, said guide bar having a terminal portion adjoining its oblique portion and extending parallel to the direction of plunger movement, the plunger being advanced along said terminal portion by the application of the whole movement of the driving member, whereby none of said movement is applied to the carriage and said carriage comes to rest.

10. In the combination defined in claim 8, said motion-transmitting means including speed reducing gearing which causes the plunger to traverse said oblique portion of the guide bar at slow speed, thus augmenting the resultant retardation of the carriage.

11. In a machine tool, a carriage mounted for reciprocatory movement, a reciprocatory driving member mounted for movement relative to said carriage, and a driving connection between said driving member and said carriage including a toothed gear journaled for rotation on the carriage and meshing with rack teeth on said driving member, a small gear rigid with the first mentioned gear, and a toothed plunger meshing with said smaller gear and mounted on the carriage for movement transversely of the direction of movement of the carriage, together with means for providing a control surface positioned for encounter by said plunger and extending for engagement therewith during travel of the carriage, the contour of said control surface including a portion parallel to the direction of travel of the carriage for holding the plunger and gears stationary and rendering the driving connection effective, said surface also including an obliquely extending portion along which the plunger is moved by the driving member acting through said gears, whereby only a portion of the driving member movement is applied to the carriage while the plunger is traversing said oblique portion of the control surface and the carriage is thus retarded.

12. In a machine tool, a carriage mounted for reciprocatory movement, a reciprocatory driving member mounted for movement relative to said carriage, and a driving connection by which movement is transmitted by said driving member to said carriage including a toothed gear member journaled for rotation on the carriage and meshing with rack teeth on said driving member, and a holding member mounted on the carriage for movement transversely of the direction of carriage travel and operatively connected to be so moved by rotation of said gear member, together with means positively controlling such transverse movement of the holding member and thereby timing the motion transmitted to the carriage from the driving member.

13. In a machine tool, a carriage mounted for reciprocatory movement, a reciprocatory driving member mounted for movement relative to said carriage, and a driving connection between said driving member and said carriage including a toothed gear member journaled for rotation on the carriage and meshing with rack teeth on said driving member, and means for controlling said gear member comprising a cam element and a follower element, the follower element being mounted on the carriage for movement transversely of the direction of carriage travel and being operatively connected to be so moved by rotation of said gear member, the cam element extending adjacent the path of carriage travel and having a face along which a cooperating face of the follower is slidable as the carriage advances, said face of the cam element including a portion parallel to the direction of carriage movement which prevents transverse movement of the follower element and rotation of the gear member for maintaining an effective connection between the driving member and the carriage, said parallel portion adjoining a transversely extending portion in contact with which the follower is movable to permit rotation of the gear member, one of said contacting elements being oblique to the direction of movement of the follower whereby during such transverse movement a portion of the driving member movement is applied to the follower and only the remainder of such movement is applied to the carriage so that the travel of the carriage is retarded.

14. In a machine tool, a carriage mounted for reciprocatory movement, a reciprocatory driving member mounted for movement relative to said carriage, and a driving connection between said driving member and said carriage including an element mounted on the carriage for movement transversely of the direction of travel of the carriage and in response to movement of the driving member, together with means extending along the path of carriage travel engaging said element, said means having a portion extending parallel to the direction of carriage movement to hold said element stationary on the carriage and render the driving connection effective for fully applying movement of the driving member to the carriage, and said means having also an obliquely extending portion along which the said element is moved for causing only a portion of the driving member movement to be applied to the carriage, whereby the travel of the carriage is retarded.

15. In a machine tool, a carriage mounted for reciprocatory movement, a reciprocatory driving member mounted for movement relative to said carriage, and a driving connection between said driving member and said carriage including an element mounted on the carriage for movement transversely of the direction of travel of the carriage, motion-transmitting means connecting said element with the driving member, and a fixed guide extending along the path of carriage travel engaging said element, said guide having a portion extending parallel to the direction of carriage movement to hold said element stationary in the carriage and render the driving connection effective for fully applying movement of the driving member to the carriage, and said guide having also an obliquely extending portion along which the said element is moved for causing only a portion of the driving member movement to be applied to the carriage, whereby the travel of the carriage is retarded.

16. In a machine tool, a carriage mounted for reciprocatory movement, a reciprocatory driving member mounted for movement relative to said carriage, and a driving connection between said driving member and said carriage including an element mounted for movement about an axis on the carriage and transmitting movement to said carriage by direct engagement with the driving member, and a holding member operatively connected to said element and mounted for movement thereby transversely of the direction of carriage travel, together with fixed means adjacent which the carriage travels, said means controlling such transverse movement of the holding member and thereby controlling the motion transmitted to the carriage from the driving member.

17. In a machine tool, a carriage mounted for reciprocation, a reciprocatory driving member, transmitting means mounted on the carriage movable relatively thereto and in constant engagement with said driving member and fixed control means adjacent which the carriage travels operating to hold said transmitting means against relative movement on the carriage to effect travel of the carriage bodily with the driving member and subsequently permitting such relative movement of the transmitting means to effect travel of the carriage at a slower rate.

18. In a machine tool, a carriage mounted for reciprocation, a reciprocatory driving member, a transmitting member mounted on the carriage movable relatively thereto and in constant engagement with the driving member, and means controlling the rate of relative movement of the transmitting member on the carriage and thereby controlling the proportion of the movement of the driving member which is effective to cause travel of the carriage.

19. In a machine tool, a carriage mounted for reciprocation, a reciprocatory driving member, transmitting means mounted on the carriage, movable relatively to said carriage and in constant engagement with the driving member, and fixed control means adjacent which the carriage travels with said transmitting means in engagement therewith, two different portions of the control means being formed to cause the relative movement of the transmitting means on the carriage at different rates respectively and to thereby effect travel of the carriage at two different rates during different portions respectively of its movement in one direction.

BENGT R. GRANBERG.
ALFRED G. ERICSON.